United States Patent [19]

Takeuchi et al.

[11] 3,884,531

[45] May 20, 1975

[54] DEVICE FOR CONTROLLING THE BRAKING FLUID PRESSURE IN THE HYDRAULIC BRAKE SYSTEM OF MOTOR VEHICLES

[75] Inventors: Yasuhisa Takeuchi; Haruhiko Iizuka, both of Yokosuka, Japan

[73] Assignee: Nissan Motor Company Limited, Yokohama, Japan

[22] Filed: Nov. 15, 1973

[21] Appl. No.: 416,065

[30] Foreign Application Priority Data
Nov. 20, 1972  Japan.............................. 47-115671

[52] U.S. Cl........................... 303/21 BE; 188/181 C
[51] Int. Cl................................................ B60t 8/08
[58] Field of Search ................. 188/181; 303/20, 21; 307/10 R; 317/5; 324/161–162; 340/53, 62, 262–263

[56] References Cited
UNITED STATES PATENTS
3,612,622  10/1971  Riordan ...................... 188/181 A X 3,682,515  8/1972  Packer et al. .................... 303/21 BE
3,744,855  7/1973  Ochiai ............................. 303/21 BE
3,768,872  10/1973  Urban et al. .................... 303/21 BE
3,768,873  10/1973  Hirzel ............................. 303/21 BE Primary Examiner—Trygve M. Blix
Assistant Examiner—Stephen G. Kunin

[57] ABSTRACT

To provide stabilized braking of a motor vehicle through a minimized stopping distance, the braking pressure to be applied to the driving wheel of the vehicle is controlled by the use of a signal which is sufficiently reliably indicative of the actual cruising speed of the vehicle, wherein the signal is produced through detection of the circumferential speed of not only the driving wheel but the trailing or non-driven wheel so that the objectionable factors influencing the signal are minimized.

1 Claim, 3 Drawing Figures

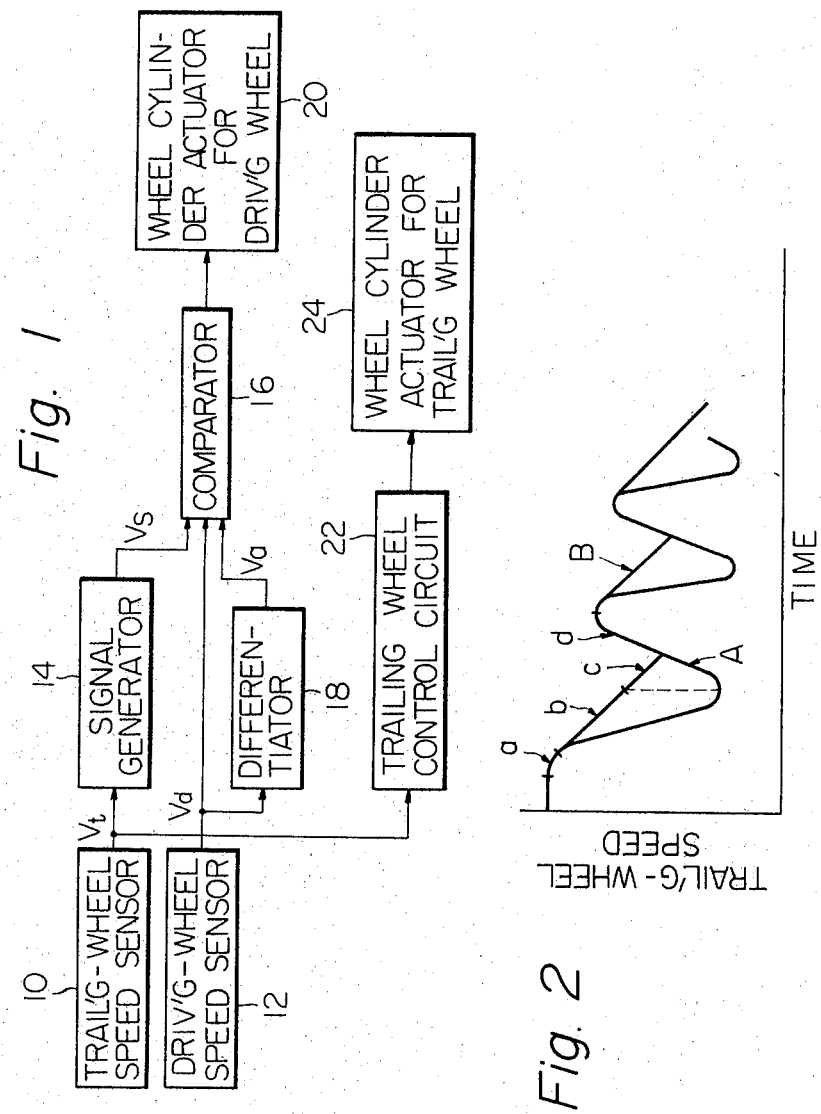

DEVICE FOR CONTROLLING THE BRAKING FLUID PRESSURE IN THE HYDRAULIC BRAKE SYSTEM OF MOTOR VEHICLES

The present invention relates to hydraulic brake systems for motor vehicles and, more particularly, to a device for controlling the braking fluid pressure in the hydraulic brake system.

In order to bring the road wheels of a motor vehicle to a standstill under stabilized conditions and through a minimized stopping distance, it is required that the percentage slip defined by $$100 \times \frac{\text{Vehicle speed-circumferential speed of wheel}}{\text{Vehicle speed}}$$

be maintained within a range of from 15 to 20 percent as is well known in the art. To control the brake system in a manner to provide such a slip percentage, it is important that the actual speed of the vehicle be detected exactly. One proposed method of obtaining the vehicle speed of an acceptable exactness is to detect the rate of deceleration of the vehicle during braking and to integrate the detected rate of deceleration by an electrical arrangement. The vehicle speed calculated in this fashion is not fully acceptable in that it is significantly influenced by the inclination of a slope of a road.

The state of rotation of the driving wheel during braking is represented by an equation of motion $$I \dot{\omega} = To - (Tb + Te),$$

where I is the moment of inertia about an axis of the driving wheel, $\dot{\omega}$ is the angular acceleration of the driving wheel, $To$ is the driving torque of the wheel, $Tb$ is the braking torque applied to the wheel from the wheel cylinder, and $Te$ is the braking torque produced in the wheel when the vehicle is being "braked" by the engine. The moment of inertia I about the axis of the driving wheel and the braking torque $Te$ applied to the driving wheel from the engine vary with the positions of the gears in the power transmission system and, as a consequence, the rotational movement of the driving wheel significantly varies with the gear ratio which is selected at the very moment when the brakes are applied. In controlling the driving wheels during braking, it is thus important that not only the variation in the coefficient of friction between the tires and the road surfaces but the selected gear ratio be responded to accurately. Difficulty is, however, encountered to achieve this end because it is practically impossible to obtain an exact actual speed of the vehicle.

Whereas, it is known that the moment of inertia about an axis of the non-driven trailing wheel remains substantially constant and is completely free from the influence of the braking on the engine. The rotational movement of the trailing wheel is thus not subject to variation due to the inclination of the road or the selected gear ratio and can therefore be controlled far easily than the driving wheel.

It is, accordingly, an important object of the present invention to provide a device adapted to enable the braking system of a motor vehicle to stop the vehicle under stabilized condition and through a minimized stopping distance.

It is another important object of the invention to provide a device which is capable of controlling the driving wheel of a motor vehicle by means of signals which are substantially free from the influences of the inclination of the ground, the gear ratio selected in the power transmission and the braking torque applied to the driving wheel from the engine during braking.

It is still another important object of the invention to provide a device which is capable of producing a signal sufficiently reliably indicative of the speed of rotation of the trailing wheel of a motor vehicle and pertinently controlling the road wheels of the vehicle in accordance with such a signal during braking.

It is still another important object of the invention to provide a device by which the road wheels of a motor vehicle are prevented from becoming fixed to develop a tendency of lateral slip even when the wheels are braked upon rapidly.

Yet, it is another important object of the invention to provide a device which is not only adapted to stably and rapidly brake the vehicle but to permit the vehicle to be steered during braking.

In accordance with the present invention, these objects will be accomplished in a device which comprises first sensing means for producing an output voltage substantially proportional to the circumferential speed or rotation of the trailing wheel of the vehicle, second sensing means for producing an output voltage substantially proportional to the circumferential speed of rotation of the driving wheel of the vehicle, a signal generator for producing from the signal voltage from the first sensing means a signal voltage which is (1) equal to the output voltage from the first sensing means when the rate of decrease of the output voltage from the first sensing means is lower than a predetermined value, (2) decreased at a constant rate when the rate of decrease of the output voltage from the first sensing means is higher than the predetermined value or the output voltage from the first sensing means is increasing and lower than the signal voltage from the signal generator and (3) increased substantially at the same rate as the output voltage from the first sensing means when the output voltage from the first sensing means is higher than the signal voltage from the signal generator, a differentiator for differentiating with respect to time the output voltage from the second sensing means and producing a signal voltage representative of the rate of acceleration of the driving wheel, a comparator receiving the signal voltages from the signal generator and the differentiator and the output voltage from the second sensing means for producing a reference voltage which is equal to the difference between a predetermined proportion of the signal voltage from the signal generator and a predetermined constant voltage and for comparing the reference voltage with the sum of the output voltage from the second sensing means and a voltage proportional to the signal voltage from the differentiator and producing a first control signal when the reference voltage is higher than the above mentioned sum and a second control signal when the reference voltage is lower than the sum, and an actuator for the wheel cylinder of the driving wheel, the actuator causing the wheel cylinder to reduce the braking pressure on the driving wheel when supplied with the first control signal from the comparator and increase the braking pressure on the driving wheel when supplied with the second control signal from the comparator.

The natures and the advantages of the device according to the present invention will become more apparent from the following description taken in conjunction with the accompanying drawings, in which:

FIG. 1 is a block diagram showing a preferred embodiment of the device according to the present invention;

FIG. 2 is a graph showing the schedules of producing a signal voltage which is used in the device according to the present invention as a signal indicative of the actual speed of the motor vehicle.

Figure 3:
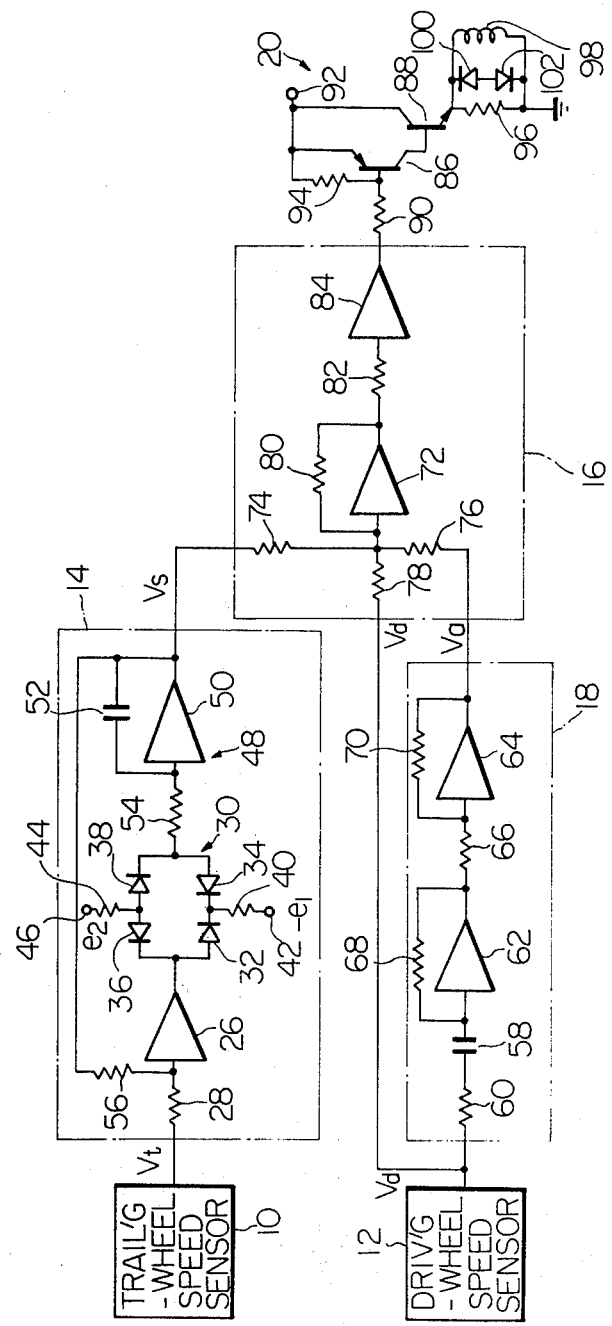
FIG. 3 is a view showing a preferred example of the circuit arrangement of part of the device shown in FIG. 1.

Reference will now be made to the drawings, first to FIG. 1. The brake pressure control circuit comprise first and second speed sensing means 10 and 12, respectively, which are operative to detect the circumferential speeds of rotation of the front or trailing wheel, not shown, and the rear or driving wheel, not shown, of the motor vehicle and to produce voltages $Vt$ and $Vd$, respectively, which are proportional to or otherwise representative of the detected wheel speeds. The voltage thus indicative of the circumferential speed of the trailing wheel is fed to a signal generator 14 which is so arranged as to produce a signal voltage $Vs$ which is modified from the input voltage $Vt$ in a manner indicated in FIG. 2.

In FIG. 2, curve A shows the variation in terms of time of the voltage $Vt$ representing the detected circumferential speed of the trailing wheel while curve B indicates the signal voltage $Vs$ to be produced from the signal generator 14 of the circuit shown in FIG. 1. The curve A is followed by the curve B when the trailing wheel is being decelerated at a rate lower than or equal to $1g$ (which equals 9.8 meters per sec.), as indicated by segment $a$ of the curve B. When the trailing wheel is being decelerated at a rate higher than $1g$, the curve B decreases at a rate corresponding to the rate of deceleration of $1g$ as shown by segment $b$ of the curve B. When the trailing wheel is accelerated as at C in FIG. 2 from the deceleration condition, the curve B continues decreasing at the rate corresponding to the rate of deceleration of $1g$ if the speed represented by the curve B at point C is higher than the detected speed of the wheel represented by the curve A as indicated by segment $c$ of the curve B. The curve B rises at the same rate as the rate of increase of the curve A if the detected trailing wheel speed represented by the curve A is higher than or equal to the speed which is represented by the curve B during acceleration of the trailing wheel. In other words, the curve A is followed by the curve B once the detected trailing wheel speed has reached the speed represented by the curve B during acceleration, as indicated by segment $d$ of the curve B.

If, thus, the actual circumferential speed of rotation of the trailing wheel is denoted by $v_t$ and the speed to be represented by the output voltage $V_s$ from the signal generator 15 is denoted by $v_s$, then a. $v_s = v_t$, if $-1g \leq \dot{v}_t < 0$,
b. $\dot{v}_s = -1g$, if $\dot{v} < -1g$,
c. $\dot{v}_s = -1g$, if $v_s > v_t$ and $\dot{v}_t \geq 0$, and
d. $\dot{v}_s = \dot{v}_t$, if $v_s \leq v_t$ and $\dot{v}_t \geq 0$.

The condition (a) or (b) is established during deceleration while the condition (c) or (d) is established during acceleration of the trailing wheel.

Turning back to FIG. 1, the signal voltage $Vs$ which has been produced by the signal generator 14 in accordance with the above mentioned schedules is fed to a first input terminal of a comparator 16. The comparator 16 has a second input terminal which is connected direct to the rear or driving wheel speed sensing means 12 so as to receive the previously mentioned signal voltage $Vd$. The signal voltage $Vd$ is also fed to a differentiator 18 which has an output terminal connected to a third input terminal of the comparator 16. The comparator 16 thus receives a signal voltage $Va$ which is representative of the rate of acceleration of the driving wheel as well as the signal voltages $Vs$ and $Vd$ which are supplied from the signal generator 14 and the driving wheel speed sensing means 12, respectively.

The comparator 16 is adapted to produce a reference voltage $Vr$ related to the signal voltage $Vs$ from the signal generator 16 and to compare the reference voltage $Vr$ with the signal voltages $Vd$ and $Va$ from the driving wheel speed sensing means 12 and the differentiator 18, respectively. The reference voltage $Vr$ may be produced in such a manner that a predetermined voltage $Vc$ corresponding to a predetermined vehicle speed of, for example, 10 km/hr. is deduced from a predetermined proportion $\alpha$ in percentage of, for example, 80 percent of the signal voltage $Vs$, so that $$Vr = Vs\,(1 - \alpha/100) - Vc.$$

The reference voltage $Vr$ thus produced is then compared with voltages represented by $(Vd + a_1 \cdot Va)$ and $(Vd + a_2 \cdot Va)$, wherein $a_1$ and $a_2$ are constants which may be given arbitarily. The comparator 16 delivers a first control signal $S_1$ when $Vr$ is larger than $(Vd + a_1 \cdot Va)$ and a second control signal $S_2$ when $Vr$ is smaller than $(Vd + a_2 \cdot Va)$. The factor $Va$ representing the rate of acceleration of the driving wheel will serve to compensate for the delay which may be invited in the operations of the mechanical components of the braking system. The constants $a_1$ and $a_2$ are usually different from each other but, where desired, they may have equal values.

The control signal $S_1$ or $S_2$ is fed to an actuator 20 for the solenoid-operated wheel cylinder, not shown, of the rear or driving wheel. The first control signal $S_1$ is effective to cause the actuator 20 to release the braking pressure from the wheel cylinder of the driving wheel while the second control signal $S_2$ is effective to cause the actuator 20 to increase the braking pressure on the driving wheel.

Where desired, a control circuit 22 may be provided which is adapted to control an actuator 24 for the solenoid-operated wheel cylinder, not shown, of the front or trailing wheel in accordance with the signal voltage $Vt$ from the trailing wheel speed sensing means 10.

FIG. 3 illustrates a practical example of the circuit arrangement of the above described nature. The signal generator 14 comprises an operational amplifier 26 which has an input terminal connected across a resistor 28 to the output terminal of the trailing wheel speed sensing means 10. The operational amplifier 26 has an output terminal connected to a converter 30 which is adapted to deliver a fixed output voltage of positive or negative polarity depending upon the polarity of the input voltage $Vt$. The converter 30 comprises first to fourth diodes 32 to 38, respectively. The first and second diodes 32 and 34 have respective cathode terminals which are connected to each other while the third and fourth diodes 36 and 38 have respective anode terminals which are connected to each other. The anode terminal of the first diode 32 and the cathode terminal of the third diode 36 are connected to the output terminal of the operational amplifier 26. The cathode terminals of the first and second diodes 32 and 34, respectively, are connected across a resistor 40 to a terminal 42 of a source of negative constant voltage $-e_1$. The anode terminals of the third and fourth diodes 36 and 38, respectively, are connected through a resistor 44 to a terminal 46 of a source of positive constant voltage $e_2$. The anode terminal of the second diode 34 and the cathode terminal of the fourth diode 38 are connected to an output terminal of the converter 30 so that the four diodes 32 to 36 constitute a closed loop which is connected on one hand to the source of negative constant voltage and on the other hand to the source of positive constant voltage.

The output terminal of the converter 30 is connected to an input terminal of an integrator 48. The integrator 48 consists of an operational amplifier 50 and a capacitor 52 which are connected in parallel to the anode terminal of the second diode 34 and the cathode terminal of the fourth diode 38 of the converter 30 through a resistor 54. The output terminal of the operational amplifier 50 and one electrode of the capacitor 52 are connected in parallel to the input terminal of the operational amplifier 26 through a resistor 56. The combination of the operational amplifier 26 and the resistors 28 and 56 constitutes a comparator as will be understood as the description proceeds. The output terminal of the integrator 48 or more particularly of the operational amplifier 50 thereof is connected to the previously mentioned first input terminal of the comparator 16 so as to supply thereto the signal voltage Vs.

The differentiator 18 comprises a capacitor 58 which has one electrode connected across a resistor 60 to the output terminal of the driving wheel speed sensing means 12. The other electrode of the capacitor 58 is serially connected to first and second operational amplifiers 62 and 64, respectively, between which is connected a resistor 66. The first and second operational amplifiers 62 and 64 are shunted by resistors 68 and 70, respectively. The output terminal of the second operational amplifier 64 is connected to the previously mentioned second input terminal of the comparator 16 so as to deliver thereto the signal voltage Va representing the rate of acceleration of the trailing wheel.

The comparator 16, on the other hand, comprises a first operational amplifier 72 which has an input terminal connected across resistors 74, 76 and 78 to the first, second and third input terminals, respectively, of the comparator 16, viz., to the output terminals of the signal generator 14, the differentiator 18 and the driving wheel speed sensing means 12, respectively. The operational amplifier 72 is shunted by a resistor 80 and has an output terminal connected across a resistor 82 to an input terminal of an operational amplifier 84. The comparator 16 is thus constructed by the operational amplifiers 72 and 84 and the resistors 74, 76, 78, 80 and 82. The operational amplifier 84 produces at its output terminal the output signal $S_1$ or $S_2$ of the comparator 16.

The actuator 20 for the solenoid-operated wheel cylinder of the driving wheel may be constructed in any desired manner in accordance with commonly accepted practices, insofar as it is capable of releasing the braking fluid pressure from the wheel cylinder when supplied with the control signal $S_1$ and increasing the fluid pressure when supplied with the control signal $S_2$. In FIG. 3, such an actuator 20 is illustrated by way of example as comprising a combination of a p-n-p transistor 86 and an n-p-n transistor 88. The transistor 86 has a base connected through a resistor 90 to the output terminal of the operational amplifier 84 of the comparator 16. The collector electrode of the transistor 86 is connected to the base of the transistor 88. On the emitter electrode of the transistor 86 and the collector electrode of the transistor 88 is impressed a terminal voltage of, for example, 12 volts, from a terminal 92. The terminal 92 is also connected to the base of the transistor 86 through a resistor 94. The n-p-n transistor 88 has its emitter electrode grounded through a parallel combination of a resistor 96, a primary coil 98 of a solenoid which is associated with the wheel cylinder, not shown, of the trailing wheel, and diodes 100 and 102 which have respective anode terminals serially connected to each other.

When, now, the motor vehicle decelerates rapidly, the voltage Vt supplied from the trailing wheel speed sensing means 10 abruptly so that the output of the operational amplifier 26 of the signal generator 14 will reach a negative saturation voltage. The combination of the operational amplifier 26 and the associated resistors 28 and 56 thus serves as a comparator circuit. The integrator 48 constructed by the combination of the operational amplifier 50, the capacitor 52 and the resistor 54 accordingly receives the negative constant voltage $-e_1$ from the source 42 through the resistor 42 and the second diode 34 of the converter 30. It therefore follows that the output voltage Vs from the operational amplifier 50 of the integrator 48 approaches zero from the negative at a rate which is dictated by a time constant determined by the resistors 40 and 54, the diode 34 and the capacitor 52. The output voltage Vs of the signal generator 14 thus decreases at a predetermined rate from the level of the input voltage Vt. This voltage Vs is in correspondence with that indicated by the segment b of the curve B of FIG. 2.

When the motor vehicle is then accelerated, the output of the comparator comprises by the operational amplifier 26 and the resistors 28 and 56 remains unchanged and accordingly the output voltage Vs from the operational amplifier 50 continues decreasing at the constant predetermined rate as long as the voltage Vt is lower than the voltage Vs, viz., the rotational speed of the trailing wheel is lower than the speed represented by the output voltage Vs of the operational amplifier 50. This condition is indicated by the segment c of the curve B in FIG. 2. When the motor vehicle is further accelerated and consequently the voltage Vt rises beyond the level Vs, the output of the operational amplifier 26 reaches a positive saturation voltage so that the integrator 48 constructed by the operational amplifier 50, the capacitor 52 and the resistor 54 receives the positive constant voltage $e_2$ from the source 46 through the resistor 44 and the fourth diode 38 of the converter 30. If, in this instance, the resistor 44 and the diode 38 of the converter 30 and the capacitor 52 and the resistor 54 of the integrator 48 are so selected as to provide a sufficiently small time constant to be determined by such elements, the output voltage Vs of the integrator 48 will rapidly rise up to and slightly exceed the value Vt which is proportional to the circumferential speed of rotation of the trailing wheel. When the voltage Vs thus becomes appreciably higher than the voltage Vt, the former decreases at a constant rate as previously mentioned and, when the voltage Vs is thus decreased below the level V$t$, the former rapidly starts increasing until it slightly exceeds the level V$t$. As a result of such frequent repetitions of increase and decrease of the voltage V$s$ across the level V$t$, the voltage V$s$ is main-substantially equal to the voltage V$t$ so that the waveform indicated by the segment $d$ of the curve B of FIG. 2 can be achieved.

While the signal voltage V$s$ related to the speed of rotation of the trailing wheel is being produced in this manner, the voltage V$d$ supplied from the driving wheel speed sensing means 12 is differentiated with respect to time by the differentiator 18 which is constructed by the capacitor 58, the resistor 60, the operational amplifiers 62 and 64, and the resistors 68, 70 and 72, delivering the signal voltage V$a$ which is indicative of the rate of acceleration of the driving wheel.

The comparator 16 consisting of the operational amplifier 72, the resistors 74, 76, 78, 80 and 82, and the operational amplifier 84 thus receives the control signal V$s$ representing the presumed vehicle speed, the signal voltage V$d$ representing the circumferential speed of rotation of the driving wheel, and the control signal representing the rate of acceleration of the driving wheel. The previously mentioned reference voltage V$r$ will thus be produced and compared with the values (V$d$ + $a_1$·V$a$) and (V$d$ + $a_2$·V$a$) so as to produce the control signal $S_1$ or $S_2$ through proper selection of the resistors 74, 76, 78 and 80 of the comparator 16. If, in this instance, the constant parameters $a_1$ and $a_2$ are to be equal to each other, the resistor 76 predominant over the parameters should have a constant resistance value. Where, however, it is desired that the parameters $a_1$ and $a_2$ have different values, the resistor 76 may be arranged to be variable between two resistance values providing the particular parameters or, otherwise, an additional comparator may be provided which is constructed essentially similar to the shown comparator 16 but in which the counterpart of the resistor 76 has a resistance value which is varied from the resistor 76.

What is claimed is:

1. A device for controlling the brake pressure on a road wheel of a motor vehicle, comprising first sensing means for producing an output voltage substantially proportional to the circumferential speed of rotation of a trailing wheel of the vehicle, second sensing means for producing an output voltage substantially proportional to the circumferential speed of rotation of a driving wheel of the vehicle, a signal generator for producing from an output voltage received from said first sensing means at an input terminal thereof, a signal voltage which is (1) equal to the output voltage of the first sensing means when the output voltage of the first sensing means is decreasing at a rate lower than a predetermined value, (2) decreased at a constant rate when the output voltage from said first sensing means is decreasing at a rate higher than said predetermined value or the output voltage of the first sensing means is increasing and lower than the signal voltage from the signal generator, and (3) increased substantially at the same rate as the output voltage from the first sensing means when the output voltage of the first sensing means is higher than the signal voltage from the signal generator, a differentiator for differentiating with respect to time the output voltage received from the second sensing means, at input terminal thereof, and producing a signal voltage which is representative of the rate of acceleration of the driving wheel, a comparator receiving the signal voltages from said signal generator and said differentiator and the output voltage from said second sensing means at first, second and third input terminals thereof, for producing a reference voltage which is equal to the difference between a predetermined proportion of said signal voltage from the signal generator and a predetermined constant voltage and for comparing the reference voltage with the sum of the output voltage from the second sensing means and a voltage proportional to the signal voltage from the differentiator and producing a first control signal, at an output terminal thereof, when the reference voltage is higher than said sum and a second control signal at the output terminal thereof, when the reference voltage is lower than said sum, and an actuator for the wheel cylinder of the driving wheel, the actuator being operative to cause the wheel cylinder to reduce the braking pressure on the driving wheel when supplied with said first control signal and to increase the braking pressure on the driving wheel when supplied with said second control signal, and wherein said signal generator comprises an operational amplifier, having its input terminal connected through a resistor to said input terminal of said signal generator, a converter having first to fourth diodes, the first and second diodes have respective cathode terminals which are connected to each other while the third and fourth diodes have respective anode terminals which are connected to each other, the anode terminal of the first diode and the cathode terminal of the third diode being connected to the output terminal of said operational amplifier, the cathode terminals of the first and second diodes, respectively, being connected across a resistor to a terminal of a source of negative constant voltage $-e_1$, the anode terminals of the third and fourth diodes, respectively, being connected through a resistor to a terminal of a source of positive constant voltage $e_2$, and the anode terminal of the second diode and the cathode terminal of the fourth diode being connected to an output terminal of said converter, the output terminal of said converter being connected to an input terminal of an integrator, said integrator consisting of an operational amplifier and a capacitor which are connected in parallel to the output terminal of said converter through a resistor, the output terminal of the operational amplifier and one electrode of said capacitor being connected in parallel to said input terminal of said operational amplifier through a resistor, said output terminal of said operational amplifier being connected to said first input terminal of said comparator, and wherein said differentiator comprises a capacitor which has one electrode connected across a resistor to said input terminal of said differentiator, the other electrode of said capacitor being serially connected to first and second operational amplifiers, respectively, between which is connected a resistor, the first and second operational amplifiers being shunted by first and second resistors respectively, the output terminal of said second operational amplifier being connected to said second input terminal of said comparator, and wherein said comparator comprises a first operational amplifier which has an input terminal connected across third, fourth and fifth resistors to said first, second and third input terminals, respectively, of the comparator, said first operational amplifier being shunted by a resistor and having an output terminal connected across a resistor to an input terminal of a second operational amplifier, and the output terminal of said operational amplifier is connected to said output terminal of said comparator.

* * * * *